(12) United States Patent
Terui et al.

(10) Patent No.: US 9,379,053 B2
(45) Date of Patent: Jun. 28, 2016

(54) SEMICONDUCTOR DEVICE HAVING SIGNAL LINE AND POWER SUPPLY LINE INTERSECTING WITH EACH OTHER

(71) Applicant: PS4 Luxco S.a.r.l., Luxembourg (LU)

(72) Inventors: Yoshimi Terui, Tokyo (JP); Kazuhiko Matsuki, Tokyo (JP)

(73) Assignee: PS4 Luxco S.a.r.l., Luxembourg (LU)

( * ) Notice: Subject to any disclaimer, the term of this patent is extended or adjusted under 35 U.S.C. 154(b) by 105 days.

(21) Appl. No.: 13/786,013

(22) Filed: Mar. 5, 2013

(65) Prior Publication Data

US 2013/0228935 A1    Sep. 5, 2013

(30) Foreign Application Priority Data

Mar. 5, 2012 (JP) ................. 2012-047802

(51) Int. Cl.
```
H01L 23/498     (2006.01)
H01L 27/02      (2006.01)
H01L 27/118     (2006.01)
G06F 17/50      (2006.01)
```

(52) U.S. Cl.
CPC ...... *H01L 23/49827* (2013.01); *G06F 17/5077* (2013.01); *H01L 27/0207* (2013.01); *H01L 27/11803* (2013.01); *G06F 2217/02* (2013.01); *H01L 2924/0002* (2013.01)

(58) Field of Classification Search
CPC ................. H01L 2924/00; H01L 2924/00014; H01L 2924/0002; H01L 2224/48091; H01L 27/0207; H01L 2224/16225; H01L 2924/3011
USPC .................................................. 257/207, 773
See application file for complete search history.

(56) References Cited

U.S. PATENT DOCUMENTS

| | | | | |
|---|---|---|---|---|
| 7,219,324 | B1 * | 5/2007 | Sherlekar et al. ............. | 257/207 |
| 8,063,415 | B2 * | 11/2011 | Tsuda ........................... | 257/207 |
| 2012/0325537 | A1 * | 12/2012 | Toyao et al. .................. | 174/260 |
| 2013/0328205 | A1 * | 12/2013 | Johnson et al. ............... | 257/773 |

FOREIGN PATENT DOCUMENTS

| | | |
|---|---|---|
| JP | 2003-216063 | 7/2003 |
| JP | 2009-206402 | 9/2009 |

* cited by examiner

*Primary Examiner* — David Vu
*Assistant Examiner* — Jonathan Han (57) ABSTRACT

Disclosed herein is a semiconductor device includes: a plurality of first power supply wirings provided on a first wiring layer and extending in a first direction; a plurality of second power supply wirings provided on a second wiring layer different from the first wiring layer and extending in a second direction intersecting the first direction; a signal wiring provided on the second wiring layer and extending in the second direction; and a plurality of through-hole conductors each electrically connecting an associated one of the first power supply wirings to an associated one of the second power supply wirings. At least a part of the first power supply wirings have a notch in a portion intersecting the signal wiring.

9 Claims, 13 Drawing Sheets

SEMICONDUCTOR DEVICE HAVING SIGNAL LINE AND POWER SUPPLY LINE INTERSECTING WITH EACH OTHER

BACKGROUND OF THE INVENTION

1. Field of the Invention

The present invention relates to a semiconductor device and a designing method thereof, and particularly relates to a semiconductor device including a plurality of wiring layers and a designing method of the semiconductor device.

1. Description of Related Art

A semiconductor device is typically designed by combining a plurality of needed standard cells to lay out circuit blocks having desired functions on a semiconductor substrate (see Japanese Patent Application Laid-open No. 2009-206402). "Standard cells" refer to pre-registered layouts of logic circuits having basic functions, such as an inverter circuit and a NAND gate circuit. Wirings for connecting constituent elements in each of the standard cells and those for connecting the standard cells are formed on a plurality of metal wiring layers that are positioned on upper layers than a gate wiring layer.

If a first wiring layer, a second wiring layer, and a third wiring layer are provided in this order from below as an example of the metal wiring layers, wirings extending, for example, in an X direction are mainly formed on the first and third wiring layers, and wirings extending, for example, in a Y direction are mainly formed on the second wiring layer. In this case, the wirings formed on the first wiring layer intersect those formed on the second wiring layer, and the wirings formed on the second wiring layer intersect those formed on the third wiring layer.

If the wirings intersect one another between adjacent wiring layers, parasitic capacitances are generated in intersection regions. Because these parasitic capacitances possibly degrade signal transmission characteristics, it is necessary to reduce the parasitic capacitances depending on the types of signals to be transmitted. Japanese Patent Application Laid-open No. 2003-216063 describes a method of reducing an intersection area by providing a notch in one of intersecting wirings and thereby reducing a parasitic capacitance although this technique relates to a flat display and not to a semiconductor device.

However, because the technique described in Japanese Patent Application Laid-open No. 2003-216063 relates to a flat display, the layout of wirings and elements are accordingly determined and therefore it is easy to design the positions of notches, the sizes, and the like. In a semiconductor device, particularly in a semiconductor device using standard cells, in contrast, the layout of wirings and elements greatly differ depending on required circuit functions, characteristics, and the like, and therefore it is difficult to simply apply the technique described in Japanese Patent Application Laid-open No. 2003-216063 to such a semiconductor device. Particularly, a power supply is sometimes intensified by using meshed power supply wirings in the semiconductor device. In this case, because the power supply wirings are additionally formed so as to fill vacant spaces in which no other wirings are formed, unintended large parasitic capacitances are sometimes generated in signal wirings.

SUMMARY

In one embodiment, there is provided a semiconductor device that includes: a plurality of first power supply wirings provided on a first wiring layer and extending in a first direction; a plurality of second power supply wirings provided on a second wiring layer different from the first wiring layer and extending in a second direction intersecting the first direction; a signal wiring provided on the second wiring layer and extending in the second direction; and a plurality of through-hole conductors electrically connecting one of the first power supply wirings to one of the second power supply wirings in regions where the first power supply wiring intersects the second power supply wiring, wherein at least a part of the first power supply wirings have a notch in a portion intersecting the signal wiring.

In another embodiment, there is provided a semiconductor device that includes: a power supply wiring formed into a meshed shape; and a first signal wiring intersecting the power supply wiring, wherein the power supply wiring includes first and second wiring parts whose wiring width is a first width, and a third wiring part that connects the first wiring part to the second wiring part and whose wiring width is a second width smaller than the first width, and the first signal wiring intersects the third wiring part of the power supply wiring.

In still another embodiment, there is provided a semiconductor device that includes: a first signal wiring formed on a first wiring layer and transmitting a first signal; and a first power supply wiring formed on a second wiring layer different from the first wiring layer, a predetermined power supply potential being supplied to the first power supply wiring, the first power supply wiring being formed to have a reduced wiring width at a position at which the first power supply wiring intersects the first signal wiring.

DETAILED DESCRIPTION OF THE EMBODIMENTS

Preferred embodiments of the present invention will be explained below in detail with reference to the accompanying drawings.

Figure 1:
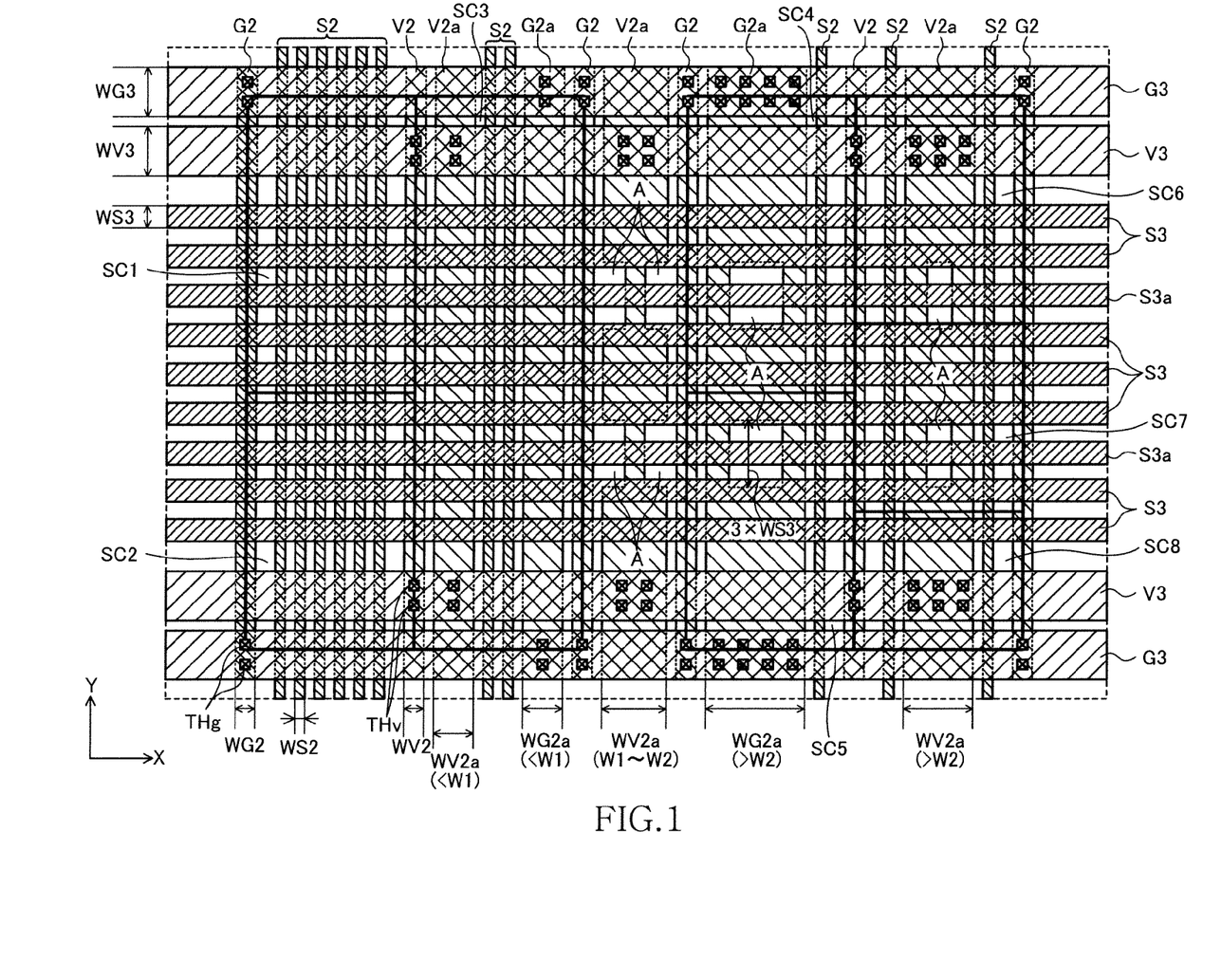
FIG. 1 is a schematic plan view showing main parts of a semiconductor device according to an embodiment of the present invention.

Referring now to FIG. 1, the semiconductor device according to the present embodiment is a standard-cell-type semiconductor device, and a plurality of standard cells are laid out on a semiconductor substrate based on required circuit functions and characteristics. FIG. 1 shows eight standard cells SC1 to SC8 among these standard cells. On each of the standard cells SC1 to SC8, wirings for connecting constituent elements in each of the standard cells SC1 to SC8 and those for connecting the standard cells SC1 to SC8 are provided. Although not particularly limited in the embodiment, a first wiring layer, a second wiring layer, and a third wiring layer are provided in this order as upper wiring layers than a gate wiring layer. However, FIG. 1 shows only the second and third wiring layers for simplifying the configuration in the drawing. The second wiring layer is a wiring layer on which wirings extending in a Y direction are mainly formed. The third wiring layer is a wiring layer on which wirings extending in an X direction are mainly formed.

As shown in FIG. 1, signal wirings S2 and power supply wirings V2, G2, V2a, and G2a each extending in the Y direction are formed on the second wiring layer. The signal wiring S2 is a wiring for transmitting a predetermined signal. The power supply wirings V2 and V2a are wirings for supplying a power supply potential VDD, and the power supply wirings G2 and G2a are wirings for supplying a ground potential GND. If it is assumed herein that a wiring width of the signal wiring S2 is WS2, that of the power supply wiring V2 is WV2, and that of the power supply wiring G2 is WG2, the widths WS2, WV2, and WG2 satisfy the following relations.

$$WS2 < WV2$$

$$WS2 < WG2$$

Although not particularly limited, the wiring width WS2 of the signal wiring S2 is designed to have the smallest wiring width on the second wiring layer. Therefore, the wiring width WV2 of the power supply wiring V2 and the wiring width WG2 of the power supply wiring G2 are larger than the smallest wiring width on the second wiring layer.

The power supply wirings V2a and G2a wider than the power supply wirings V2 and G2 are also provided on the second wiring layer. These wide power supply wirings V2a and G2a are provided additionally to fill vacant spaces on the second wiring layer and notches A are provided in a part of the power supply wirings V2a and G2a, as described later in detail. The notch A refers to a region that is present within the wiring width of the power supply wiring and from which the power supply wiring is deleted. Because the power supply wirings V2a and G2a are formed in the vacant spaces, the power supply wirings V2a and G2a have various wiring widths. If the wiring widths of the power supply wirings V2a and G2a are assumed as WV2a and WG2a, respectively, the wiring widths WVa2 and WG2a satisfy the following relations.

$$WV2 \leq WV2a$$

$$WG2 \leq WG2a$$

On the other hand, signal wirings S3 and S3a and power supply wirings V3 and G3 each extending in the X direction are formed on the third wiring layer. The signal wirings S3 and S3a are wirings for transmitting predetermined signals respectively, and the power supply wirings V3 and G3 are wirings for supplying the power supply potential VDD and the ground potential GND, respectively. The signal wiring S3a is a signal line for transmitting a particularly important signal. For example, the particularly important signal corresponds to a signal required to have a particularly high signal quality because of a small timing margin.

If it is assumed that a wiring width of each of the signal wirings S3 and S3a is WS3, that of the power supply wiring V3 is WV3, and that of the power supply wiring G3 is WG3, the wiring widths WS3, WV3, and WG3 satisfy the following relations.

$$WS3 < WV3$$

$$WS3 < WG3$$

Although not particularly limited, the wiring width WS3 of each of the signal wirings S3 and S3a is designed to have the smallest wiring width on the third wiring layer. Therefore, the wiring width WV3 of the power supply wiring V3 and the wiring width WG3 of the power supply wiring G3 are larger than the smallest wiring width on the third wiring layer.

A plurality of through-hole conductors THv are provided in each of regions in which the power supply wiring V2 or V2a provided on the second wiring layer intersects each of the power supply wirings V3 provided on the third wiring layer. The through-hole conductor THv is a conductor for electrically connecting the two wirings V2 or V2a and V3, and the wirings for supplying the power supply potential VDD are thereby formed into meshed wirings extending in the X and Y directions. Similarly, a plurality of through-hole conductors THg are provided in each of regions in which the power supply wiring G2 or G2a provided on the second wiring layer intersects each of the power supply wirings G3 provided on the third wiring layer. The through-hole conductor THg is a conductor for electrically connecting the two wirings G2 or G2a and G3, and the wirings for supplying the ground potential GND are thereby formed into meshed wirings extending in the X and Y directions. By forming the power supply wirings into meshed wirings, the power supply is intensified and can suppress local potential variations. Therefore, it is possible to stabilize the power supply potential VDD and the ground potential GND.

As shown in FIG. 1, the respective power supply wiring V2a and G2a have the notches A in regions in which the respective power supply wiring V2a or G2a each provided on the second wiring layer intersects the signal wirings S3a. The respective power supply wiring V2a and G2a do not have such the notches in the other regions. Also, the power supply wirings V2 and G2 do not have such the notches in any region.

Whether to provide the notches A in the power supply wiring V2a or G2a and in what shapes the notches A are provided are determined by the wiring width WV2a or WG2a of the power supply wiring V2a or G2a. Specifically, the notches A are not provided in the power supply wiring V2a or G2a having the wiring width WV2a or WG2a that is smaller than W1, and the notches A are provided in the power supply wiring V2a or G2a having the wiring width WV2a or WG2a that is equal to or larger than W1. Furthermore, if the wiring width WV2a or WG2a of the power supply wiring V2a or G2a is equal to or larger than W1 and smaller than W2, the notches A are provided on both sides of the power supply wiring V2a or G2a in the X direction, respectively. If the wiring width WV2a or WG2a of the power supply wiring V2a or G2a is equal to or larger than W2, the notches A are provided in central portions of the power supply wiring V2a or G2a in the X direction.

With this configuration, an intersection area by which one power supply wiring V2a or G2a having the wiring width WV2a or WG2a that is equal to or larger than W1 intersects each of the signal wirings S3a is reduced, and a parasitic capacitance of the signal wiring S3a is reduced. This can improve the signal quality of the important signal transmitted by the signal wiring S3a. As for the power supply wiring V2a or G2a having the wiring width WV2a or WG2a that is equal to or larger than W1 and smaller than W2, the notches A are provided on both sides of the power supply wiring V2a or G2a in the X direction, respectively. Therefore, the power supply wiring V2a or G2a intersects each of the signal wirings S3a in one portion. On the other hand, as for the power supply wiring V2a or G2a having the wiring width WV2a or WG2a that is equal to or larger than W2, the notches A are provided in the central portion of the power supply wiring V2a or G2a in the X direction. Therefore, the power supply wiring V2a or G2a intersects each of the signal wirings S3a in two portions. Therefore, the intersection area by which one power supply wiring V2a or G2a having the wiring width WV2a or WG2a that is equal to or larger than W2 intersects one signal wiring S3a is larger than the intersection area by which one power supply wiring V2a or G2a having the wiring width WV2a or WG2a that is equal to or larger than W1 and smaller than W2 intersects one signal wiring S3a.

Figure 2:
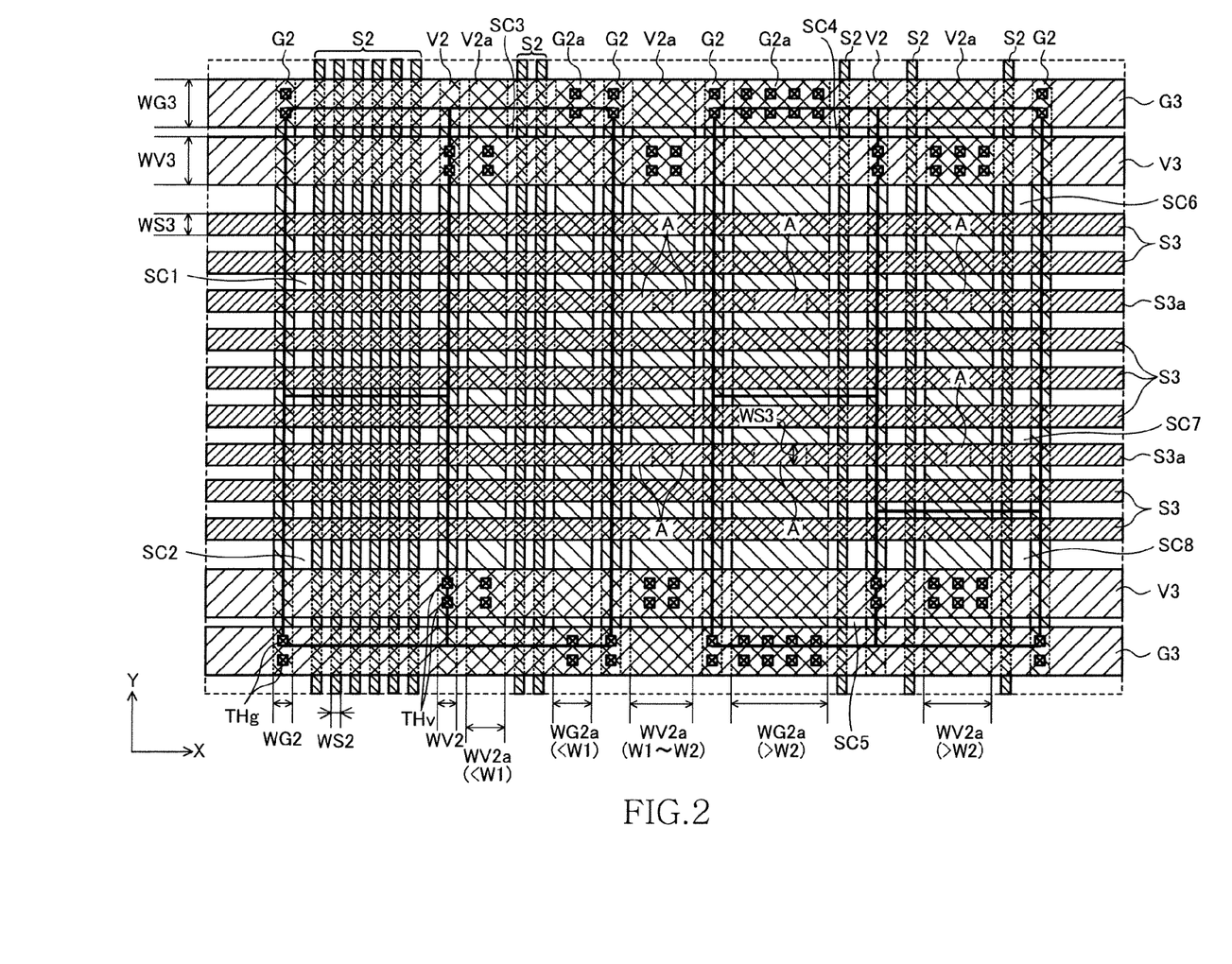
FIG. 2 shows an example in which a parameter $\alpha$ is set to 1.

While a length of each notch A in the Y direction is designed to 3×WS3 in the present embodiment, the length is not limited thereto in the present invention. The reason for setting the length of each notch A in the Y direction to 3×WS3 is that a value of a parameter α to be described later is set to 3. If the value of the parameter α is set to 1, the length of the notch A in the Y direction is WS3 as shown in FIG. 2.

A designing device for and a designing method of the semiconductor device according to the present embodiment are described next.

Figure 3:
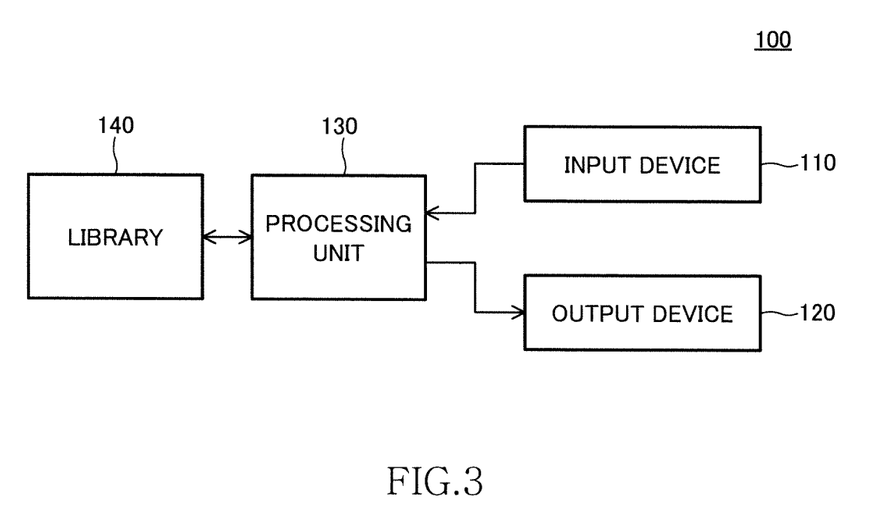
FIG. 3 is a block diagram showing a designing device for the semiconductor device according to the embodiment of the present invention.

The designing device 100 shown in FIG. 3 includes an input device 110, an output device 120, a processing unit 130 connected to the input device 110 and the output device 120, and a library 140 in which layouts of a plurality of standard cells SC are registered. Therefore, it is possible to configure the designing device 100 by using a general computer that is operated by a program. When circuit data on design-target circuit blocks are input to the designing device 100 from the input device 110, the designing device 100 outputs layout pattern data corresponding to the input circuit data from the output device 120. The layout pattern data is data that shows a physical design configuration for realizing the circuit blocks, and includes position data, form data, and the like on diffusion layers, gate electrodes, signal wirings, power supply wirings, contact conductors, and through-hole conductors.

Figure 4:
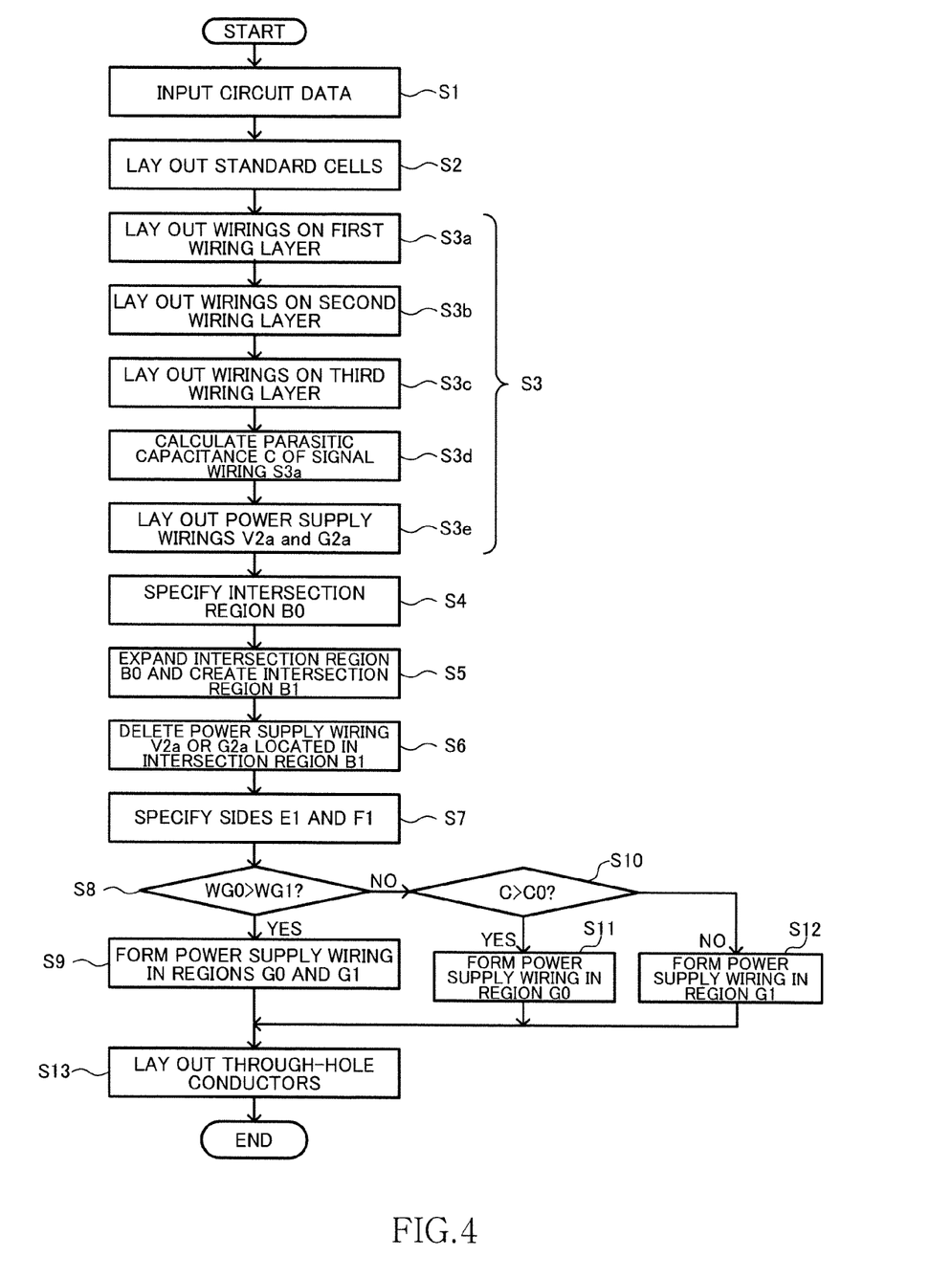
FIG. 4 is a flowchart for explaining a designing method of the semiconductor device according to the embodiment of the present invention.
Figure 5:
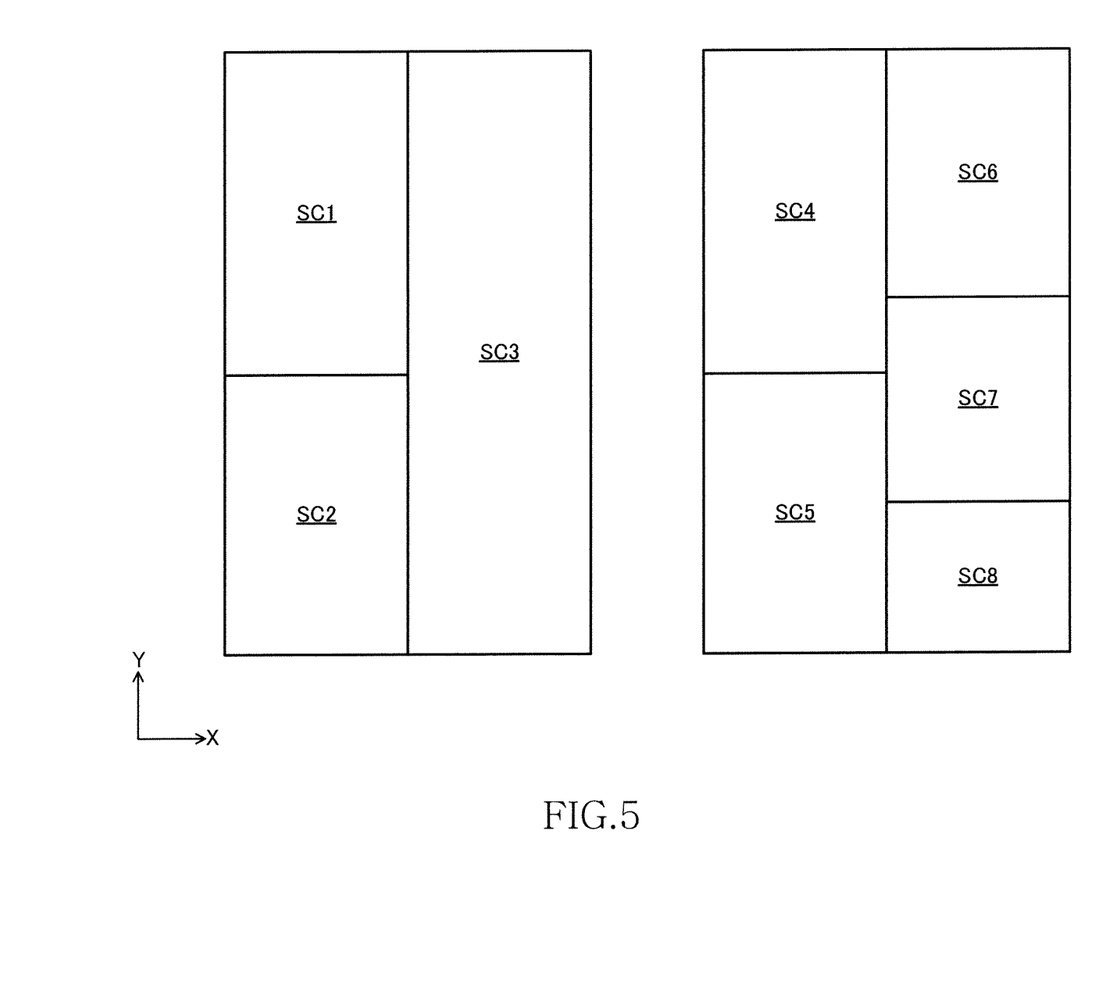
FIG. 5 shows a layout at the time of completing the step S2.

As shown in FIG. 4, the circuit data on the design-target circuit blocks is input to the designing device 100 from the input device 110 (Step S1). The input circuit data is supplied to the processing unit 130. The processing unit 130 analyzes the circuit data, specifies a plurality of standard cells SC and a combination of the standard cells SC from many standard cells SC registered in the library 140, and lays out the standard cells SC on a semiconductor substrate (Step S2). FIG. 5 shows a state where the standard cells SC1 to SC8 are laid out by performing the process in Step S2. Needless to say, the process described above is an information process performed within the designing method 100 and not for actually arranging physical cells on the semiconductor substrate. This process is for virtually laying out the standard cells SC within a virtual area defined in the designing device 100. The same holds true for subsequent processes.

Figure 6:
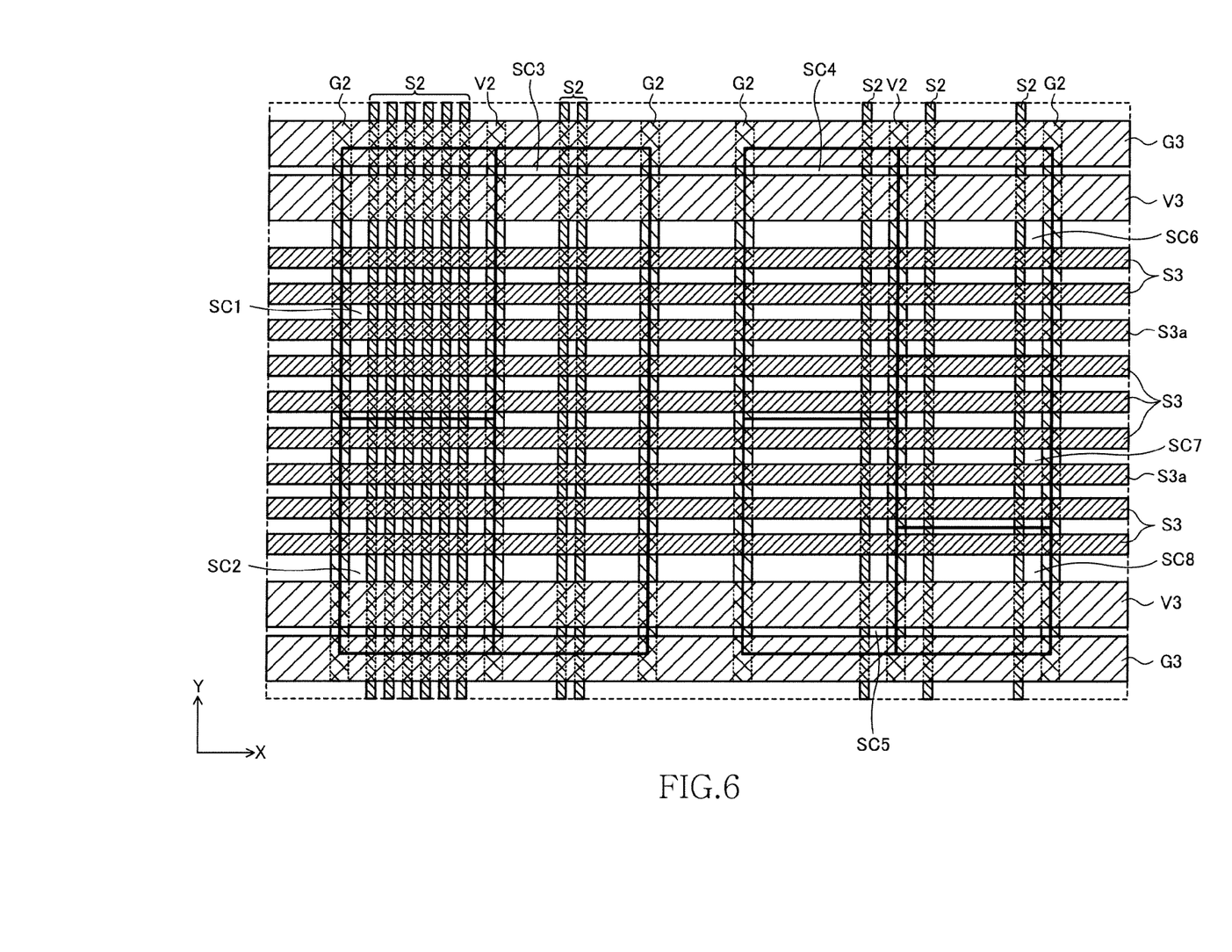
FIG. 6 shows a layout at the time of completing the step S3c.

Next, necessary wirings are laid out on the first to third wiring layers (Step S3). Although not particularly limited, the wirings are preferably laid out from lower layers in Step S3. That is, it suffices that power supply wirings and signal wirings are laid out on the first wiring layer (Step S3a), the power supply wirings V2 and G2 and the signal wirings S2 are laid out on the second wiring layer (Step S3b), and the power supply wirings V3 and G3 and the signal wirings S3 are laid out on the third wiring layer (Step S3c). When Step S3c is completed, as shown in FIG. 6, some vacant spaces are present on the second wiring layer. When the layout of the wirings is completed from the first wiring layer to the third wiring layer, a parasitic capacitance C of each of the important-signal wirings S3a formed on the third wiring layer is calculated (Step S3d).

Figure 7:
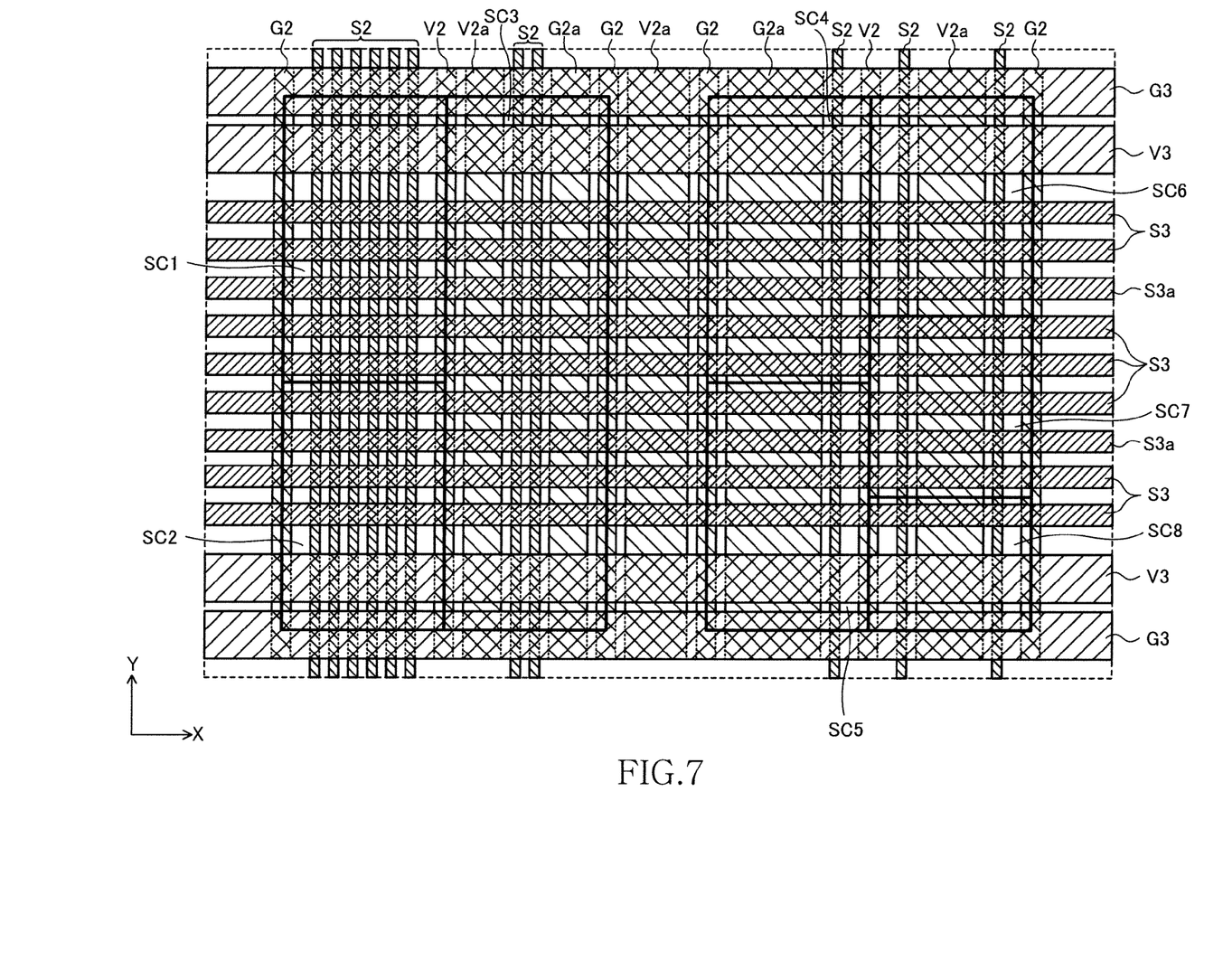
FIG. 7 shows a layout at the time of completing the step S3e.

The power supply wirings V2a and G1a are laid out in the vacant spaces on the second wiring layer (Step S3e). When Step S3e is completed, as shown in FIG. 7, all the vacant spaces present on the second wiring layer are filled. The reason for laying out the power supply wirings V2a and G2a in the vacant spaces is to intensify the meshed power supply wirings.

Figure 8A:
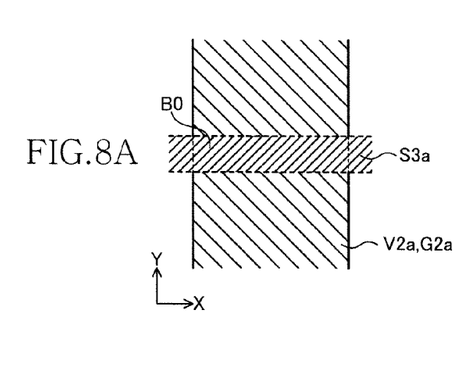
FIGS. 8A to 8G show an aspect of an intersection region in which the added power supply wiring V2a or G2a overlaps each of the important signal wirings S3a in a plan view as of each steps.

Next, an intersection region B0 shown in FIG. 8A in which the added power supply wiring V2a or G2a overlaps each of the important signal wirings S3a in a plan view is specified (Step S4).

Figure 8B:
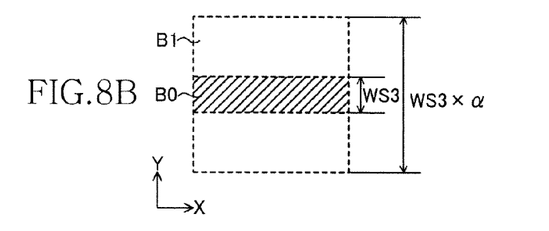

Next, a width of the intersection region B0 in the Y direction is expanded based on the parameter α, thereby creating an intersection region B1 (Step S5). The parameter α is a value registered in advance via the input device 110. The value of the parameter α is set larger if it is necessary to further reduce the parasitic capacitance of each of the important-signal wirings 3a. A width WS3 of the intersection region B0 in the Y direction is multiplied by the parameter α and an obtained value is set as an adjusted width WS3×α. The intersection region B0 with the width of WS3 is expanded to the intersection region B1 with the width of WS3×α. FIG. 8B shows an aspect in which the intersection region B0 is expanded to the intersection region B1. Although not particularly limited, the value of the parameter α is preferably equal to or larger than 1 because the intersection region B1 becomes larger than the intersection region B0 if the value of the parameter α is set equal to or larger than 1.

Figure 8C:
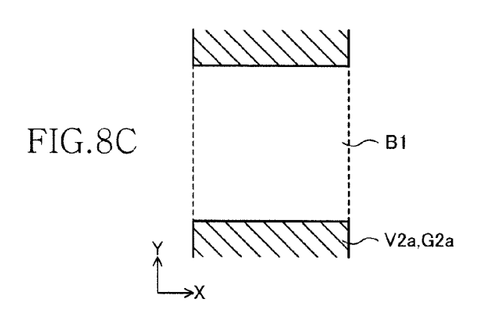

Next, the power supply wiring V2a or G2a located in the intersection region B1 is deleted (Step S6). With this step, the power supply wiring V2a or G2a does not overlap each of the signal wirings S3a in the intersection region B1. However, this divides the power supply wiring V2a or G2a in the Y direction if no further process is performed. Therefore, the divided power supply wirings V2a and G2a are connected again respectively by the following process. In the present invention, one of the divided power supply wirings V2a and G2a in the Y direction is also referred to as "first wiring part", and the other divided power supply wiring V2a or G2a is also referred to as "second wiring part". FIG. 8C shows an aspect in which the power supply wiring V2a or G2a located in the intersection region B1 is deleted.

Figure 8D:
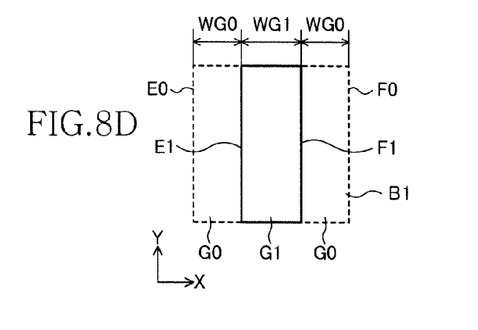

Next, as shown in FIG. 8D, positions of sides E1 and F1 obtained by shifting two sides E0 and F0 of the intersection region B1 in the X direction inside each by the smallest wiring width in the second wiring layer are specified (Step S7). This process is performed for evaluating whether a region G1 held between the sides E1 and F1 can be used as a space if a wiring is formed in regions G0 held between the sides E0 and E1 and between the sides F0 and F1.

Figure 8E:
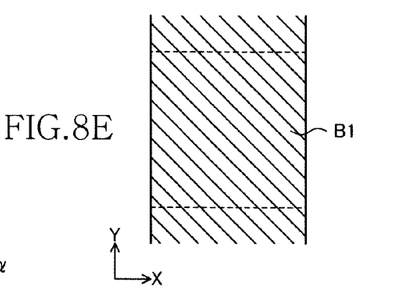

A width WG0 of each region G0 is compared with a width WG1 of the region G1 (Step S8). As a result, if WG0>WG1 satisfies, the power supply wiring V2a or G2a is formed in both of the regions G0 and G1 (Step S9). That is, the power supply wiring V2a or G2a is formed again in the intersection region B1 from which the power supply wiring V2a or G2a has been deleted in Step S6. This means that it is difficult or inappropriate to provide the notch A in the intersection region B1 because the width of the target power supply wiring V2a or G2a is small (smaller than W1). By performing this process, the divided power supply wirings V2a and G2a are connected again respectively. FIG. 8E shows an aspect in which the power supply wirings V2a and G2a are connected again respectively as a result of Step S9.

Figure 8F:
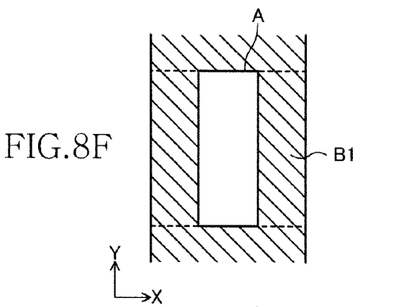

On the other hand, if WG0≤WG1 satisfies, it is determined whether the parasitic capacitance C of the signal wiring S3a calculated in Step S3d is larger than a predetermined capacitance C0 (Step S10). This is a determination as to which a higher priority is put on, a reduction in the capacitance of the signal wiring S3a or intensification of the power supply wiring V2a or G2a. As a result, if the parasitic capacitance C of the signal wiring S3a is larger than the predetermined capacitance C0, a wiring is formed in the regions G0 (Step S11). The power supply wirings V2a and G2a are thereby connected again respectively, and the region G1 held between the sides E1 and F1 becomes the notch A. FIG. 8F shows an aspect in which the power supply wirings V2a and G2a are connected again respectively as a result of Step S11. This process is performed when the width WV2a or WG2a of the target power supply wiring V2a or G2a is mainly equal to or larger than W2.

Figure 8G:
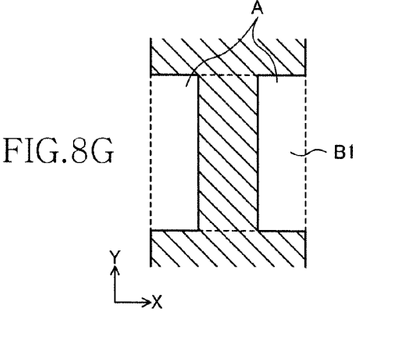

If the parasitic capacitance C of the signal wiring S3 is equal to or smaller than the predetermined capacitance C0, a wiring is formed in the region G1 (Step S12). The power supply wirings V2a and G2a are connected again respectively and the regions G0 become the notches A. FIG. 8G shows an aspect in which the power supply wirings V2a and G2a are connected again respectively as a result of Step S12. This process is performed when the width WV2a or WG2a of the target power supply wiring V2a or G2a is mainly equal to or larger than W1 and smaller than W2. In the present invention, the power supply wiring formed as a result of Step S11 or S12 is also referred to as "third wiring part". The third wiring part functions to connect the first and second wiring parts to each other, and a wiring width of the third wiring part is smaller than those of the first and second wiring parts. The signal wiring S3a intersects the third wiring part of the power supply wiring V2a or G2a. The other signal wirings S3, in contrast, intersect the first or second wiring part of the power supply wiring V2a or G2a.

After performing these processes to each intersection region B1, the corresponding wirings formed on the second and third wiring layers are connected to one another by the through-hole conductors THv or THg (Step S13). The power supply wirings are thereby formed into meshed wirings and a series of design procedures is completed.

In this way, in the present embodiment, the power supply wiring V2a and G2a have the notches in the regions in which the power supply wirings V2a and G2a intersect the important signal wirings S3a. It is thereby possible to reduce the parasitic capacitance of each important signal wiring S3a. Furthermore, though the wiring widths WV2a and WG2a of the power supply wirings V2a and G2a vary because the power supply wirings V2a and G2a are formed in the vacant spaces, it is possible to realize both the reduction in the parasitic capacitance C and the intensification of the power supply wirings V2a and G2a because it is determined whether to provide the notches A and the shapes of the notches A are selected depending on the wiring width WV2a or WG2a of the power supply wiring V2a or G1a and the parasitic capacitance C of each signal wiring S3a in the present embodiment.

The predetermined capacitance C0 used in Step S10 is explained next.

Figure 9:
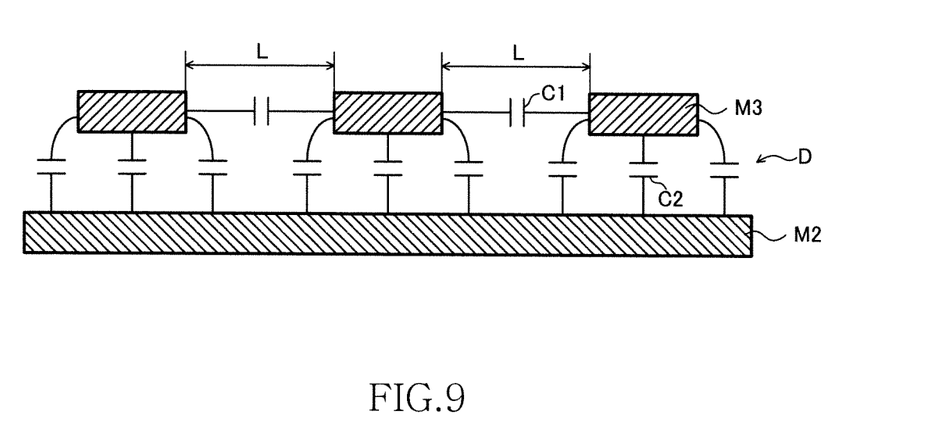
FIG. 9 is a schematic cross-sectional view for explaining parasitic capacitance components of the wiring formed on the third wiring layer.

As shown in FIG. 9, if a wiring M2 formed on the second wiring layer overlaps wirings M3 formed on the third wiring layer via an interlayer dielectric film D, a parasitic capacitance of each of the wiring M3 is a sum (=C1+C2) of a capacitance component C1 generated between the adjacent wirings M3 and a capacitance component C2 generated between the wiring M3 and the wiring M2 just under the wiring M3. Needless to say, the capacitance component C1 depends on a wiring space L of the third wiring layer and the capacitance component C2 depends on the thickness and the dielectric constant of the interlayer dielectric film D.

Figure 10A:
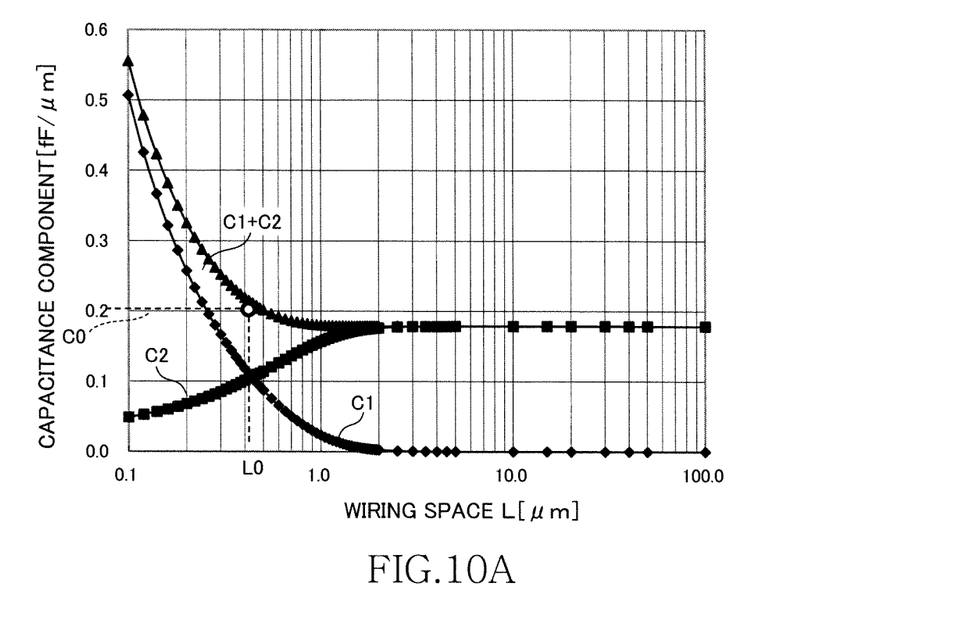
FIG. 10A is a graph showing a relation between the wiring space L of the third wiring layer and the parasitic capacitance and shows a case where the thickness of the interlayer dielectric film D is relatively small.
Figure 10B:
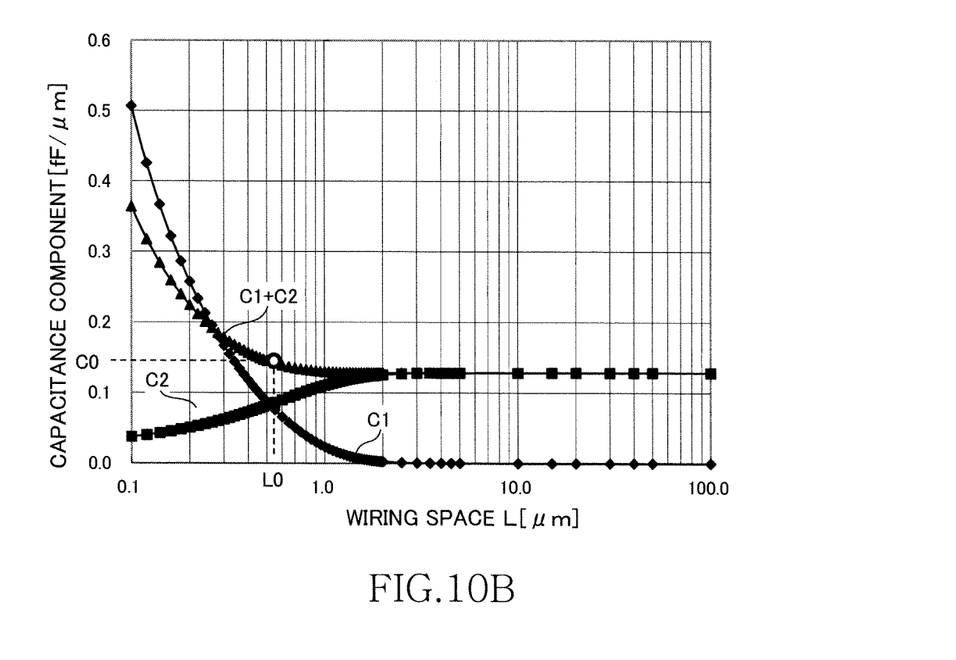
FIG. 10B is a graph showing a relation between the wiring space L of the third wiring layer and the parasitic capacitance and shows a case where the thickness of the interlayer dielectric film D is relatively large.

As shown in FIGS. 10A and 10B, when the wiring space L of the third wiring layer is expanded, the capacitance component C1 tends to decrease and the capacitance component C2 tends to increase. The combined value C1+C2 decreases as the wiring space L expands in a region in which the wiring space L is smaller than a predetermined wiring space L0. However, in a region in which the wiring space L is equal to or larger than the predetermined wiring space L0, the combined value C1+C2 substantially saturates and a correlation between the parasitic capacitance and the wiring space L is hardly recognized.

In the present embodiment, a capacitance obtained when the wiring space L is equal to L0 is defined as the predetermined capacitance C0 described above. This means that, if the parasitic capacitance C of the signal wiring S3a is smaller than the predetermined capacitance C0, it is difficult to obtain a further capacitance reduction effect, and that, if the parasitic capacitance C of the signal wiring S3a is equal to or larger than the predetermined capacitance C0, it is easy to obtain the capacitance reduction effect. Therefore, in the case where the capacitance reduction effect is easily obtained, the notch A of a type shown in FIG. 8F is selected. In the case where it is difficult to obtain the capacitance reduction effect, the notches A of a type shown in FIG. 8G are selected.

As shown in FIGS. 10A and 10B, the predetermined wiring space L0 changes depending on not only the thickness of the interlayer dielectric film D but also on the dielectric constant of an insulating material constituting the interlayer dielectric film D. Therefore, it is preferable to set the predetermined capacitance C0 based on the thickness and the dielectric constant of the interlayer dielectric film D.

It is apparent that the present invention is not limited to the above embodiments, but may be modified and changed without departing from the scope and spirit of the invention.

Figure 11:
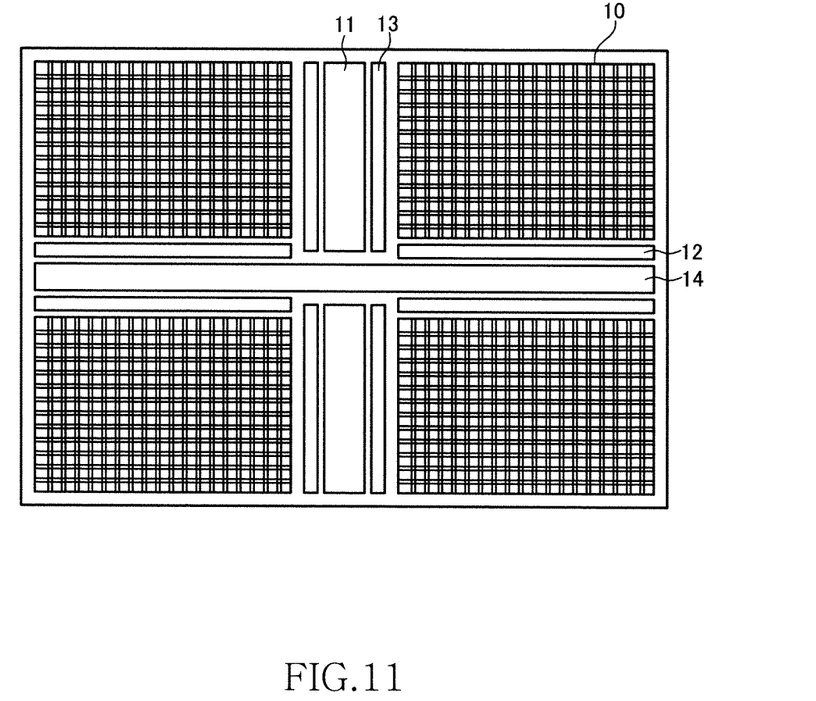
FIG. 11 shows a layout of a typical DRAM.

For example, the above embodiment has been described while referring to an example of applying the present invention to a standard-cell-type semiconductor device. However, the present invention is not limited thereto. For example, the present invention is also applicable to a part of a semiconductor memory device such as a DRAM (Dynamic Random Access memory). As shown in FIG. 11, a general DRAM includes a plurality of memory cell arrays 10, and so-called peripheral circuits such as a row decoder 11, a column decoder 12, a word driver 13, and a control logic circuit 14 are arranged among the memory cell arrays 10. If the present invention is applied to such a DRAM, it suffices to appropriately provide notches in meshed power supply wirings formed in these peripheral circuits.

Figure 12A:
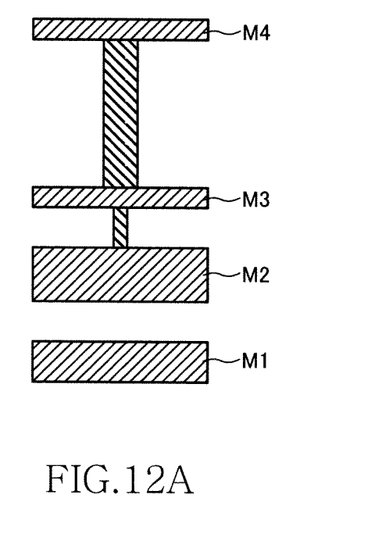
FIG. 12A shows a cross-sectional diagram showing the wiring layers M1 to M4.
Figure 12B:
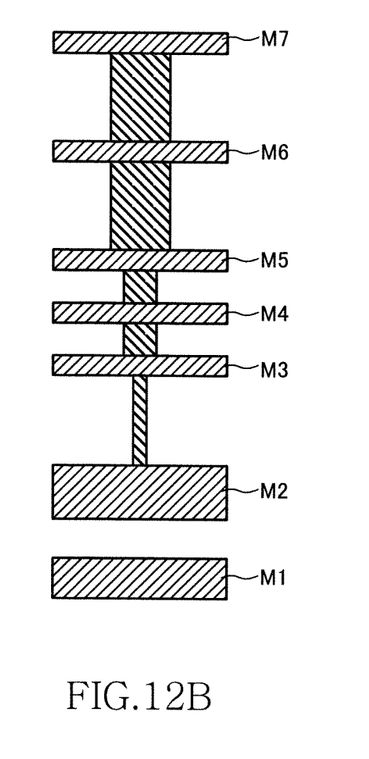
FIG. 12B shows a cross-sectional diagram showing the wiring layers M1 to M7.

Furthermore, the above embodiment has been described while referring to an example of the semiconductor device including the first to third wiring layers. However, the number of wiring layers is not limited to three. Moreover, in the embodiment described above, the notches A are provided in the power supply wirings V2a and G2a formed on the second wiring layer. However, it is not necessarily essential to form the power supply wirings in which the notches A are to be provided on the second wiring layer. As an example, the present invention is also applicable to a semiconductor device including a first wiring layer M1 to a fourth wiring layer M4 as shown in FIG. 12A, or is applicable to a semiconductor device including the first wiring layer M1 to a seventh wiring layer M7 as shown in FIG. 12B. In an example shown in FIG. 12A, a problem possibly occurs that a parasitic capacitance is generated between the second wiring layer M2 and the third wiring layer M3 because of a short distance (that is, the thickness of the interlayer dielectric film is thin) between the second wiring layer M2 and the third wiring layer M3. In this case, it is possible to obtain a high capacitance reduction effect by providing the notches A in power supply wirings formed on the second wiring layer M2 or the third wiring layer M3.

Figure 13A:
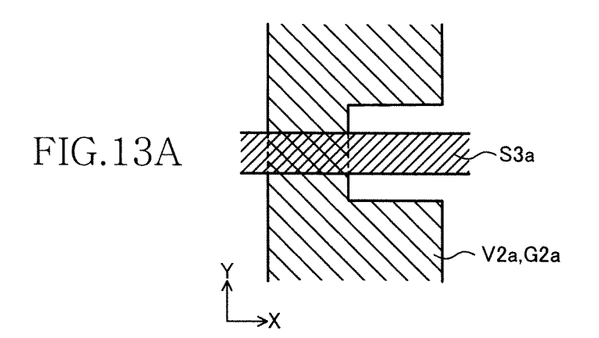
FIGS. 13A to 13C show a schematic view for explaining some shapes of the notches A.
Figure 13B:
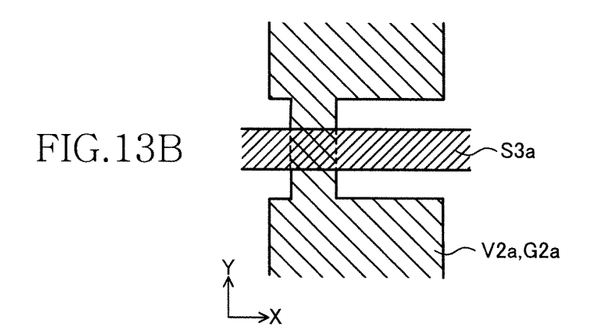
Figure 13C:
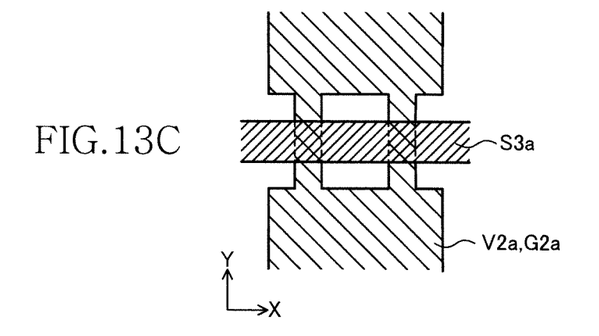

Further, in the above embodiment, the shapes of the notches A are changed depending on the wiring widths WV2a and WG2a of the power supply wirings V2a and G2a and the parasitic capacitance C of each of the signal wirings S3a. However, it is not necessarily essential to change the shapes of the notches A in the present invention. Even if the shapes of the notches A are changed depending on the wiring widths WV2a and WG2a of the power supply wirings V2a and G2a and the parasitic capacitance C of each of the signal wirings S3a, the number of types of the shapes of the notches A is not limited to two. As some alternatives, the shapes of the notches shown in FIGS. 13A to 13C can be used.

Further, the above embodiment has been described while referring to an example of selecting the shapes of the notches A based on whether the parasitic capacitance C of each signal wiring S3a is larger than the predetermined capacitance C0. However, it is not necessarily essential to select the shapes as in this example in the present invention. For example, the shapes of the notches A can be selected based on the wiring width WV2a or WG2a of the power supply wiring V2a or G2a, irrespectively of the parasitic capacitance C of each signal wiring S3a. Moreover, it is not necessarily essential to use the sum of the capacitance component C1 generated between the adjacent wirings and the capacitance component C2 generated between the upper and lower wirings as the parasitic capacitance C of each signal wiring S3a. For example, only the capacitance component C2 can be used as the parasitic capacitance C of each signal wiring S3a.

What is claimed is:

1. A semiconductor device comprising:
a plurality of first power supply wirings provided on a first wiring layer and extending in a first direction;
a plurality of second power supply wirings provided on a second wiring layer different from the first wiring layer and extending in a second direction intersecting the first direction;
a signal wiring provided on the second wiring layer and extending in the second direction; and
a plurality of through-hole conductors each electrically connecting an associated one of the first power supply wirings to an associated one of the second power supply wirings;
wherein at least a part of the first power supply wirings have a notch in a portion intersecting the signal wiring, and wherein the parasitic capacitance of the signal wiring is reduced, and wherein none of the plurality of through-hole conductors passes through the notch.

2. The semiconductor device as claimed in claim 1, wherein
each of the first power supply wirings whose wiring width in the second direction is smaller than a first width among the first power supply wirings does not have the notch in the portion intersecting the signal wiring, and
each of the first power supply wirings whose wiring width in the second direction is equal to or larger than the first width among the first power supply wirings has the notch in the portion intersecting the signal wiring.

3. The semiconductor device as claimed in claim 2, wherein
an intersection area by which each of the first power supply wirings intersects the signal wiring is a first area in which the wiring width in the second direction of the first power supply wiring is equal to or larger than the first width and smaller than a second width, and
the intersection area is a second area larger than the first area in which the wiring width in the second direction of the first power supply wiring is equal to or larger than the second width.

4. The semiconductor device as claimed in claim 3, wherein
each of the first power supply wirings whose wiring width in the second direction is equal to or larger than the first width and smaller than the second width among the first power supply wirings has the notch in both side in the second direction of the portion intersecting the signal wiring, and
each of the first power supply wirings whose wiring width in the second direction is equal to or larger than the second width among the first power supply wirings has the notch in a central portion in the second direction of the portion intersecting the signal wiring.

5. A semiconductor device comprising:
a first signal wiring formed on a first wiring layer and transmitting a first signal, wherein the first signal wiring extends in a first direction;
a first power supply wiring formed on a second wiring layer and extending in a second direction intersecting the first direction, the first power supply wiring being supplied with a predetermined power supply potential, the first power supply wiring being formed to have a notched wiring width at a position at which the first power supply wiring intersects the first signal wiring, and wherein the parasitic capacitance of the first signal wiring is reduced;
a second power supply wiring formed in a wiring layer different from the second wiring layer, the second power supply wiring extending in the first direction and being electrically connected to the first power supply wiring; and
a contact electrode formed at a position at which the first power supply wiring intersects the second power supply wiring, the contact electrode electrically connecting the first power supply wiring to the second power supply wiring, and wherein the position at which the contact electrode is formed is different from the position at which the notched wiring width is located.

6. The semiconductor device as claimed in claim 5, further comprising a second signal wiring formed on the first wiring layer, and transmitting a second signal different from the first signal, wherein the wiring width of the first power supply wiring is not reduced at a position at which the first power supply wiring intersects the second signal wiring.

7. The semiconductor device as claimed in claim 6, wherein a wiring width of the second power supply wiring is larger than a wiring width of the first signal wiring.

8. The semiconductor device as claimed in claim 6, wherein the second power supply wiring is formed on the first wiring layer.

9. The semiconductor device as claimed in claim 6, further comprising a third power supply wiring extending in the first direction and electrically connected to the second power supply wiring,
wherein the first signal wiring is arranged between the second power supply wiring and the third power supply wiring.

* * * * *